Nov. 28, 1933.　　　L. R. LUDWIG ET AL　　　1,936,798

CONVERTER SYSTEM

Filed Jan. 6, 1933

WITNESSES:

INVENTORS.
Leon R. Ludwig &
Rudolf E. Hellmund.
BY
ATTORNEY

Patented Nov. 28, 1933

1,936,798

UNITED STATES PATENT OFFICE 1,936,798

CONVERTER SYSTEM

Leon R. Ludwig, Wilkinsburg, and Rudolf E. Helimund, Swissvale, Pa., assignors to Westinghouse Electric & Manufacturing Company, East Pittsburgh, Pa., a corporation of Pennsylvania Application January 6, 1933. Serial No. 650,414

14 Claims. (Cl. 171—97)

Our invention relates to a converter system and particularly to a vapor electric system adapted to transfer power in either direction.

In the use of systems involving direct current motors, it is frequently desirable to so connect the motors that they may operate as generators for so called regenerative braking.

In direct current systems, such as street railways, steel mill drives and other similar systems where regenerative braking is an essential feature of the system operation, it has heretofore been considered necessary to utilize equipment such as rotary converters or motor generator sets which are adapted to provide a feed back from the direct current to the alternating current line or vice versa when the machines are used for regenerative braking.

In the system according to our invention, a bilaterally conducting vapor electric device is utilized to transfer energy between the alternating current and direct current circuits. A suitable make alive being controlled by system conditions to govern the direction of current in the vapor electric device.

Since vapor electric devices have a discontinuous load characteristic through zero load, it is desirable to provide a pilot machine, preferably of a dynamo electric type such as a rotary converter or pilot motor generator set to provide a continuous characteristic through zero load.

The system of our invention may be used either as a tie between a plurality of regenerative motors and a supply circuit or as a control means for a particular motor or set of motors. In the former case, the conversion equipment must automatically respond to changes in system conditions while in the latter case, the conversion equipment may be used to change the load system characteristics.

Figure 1:
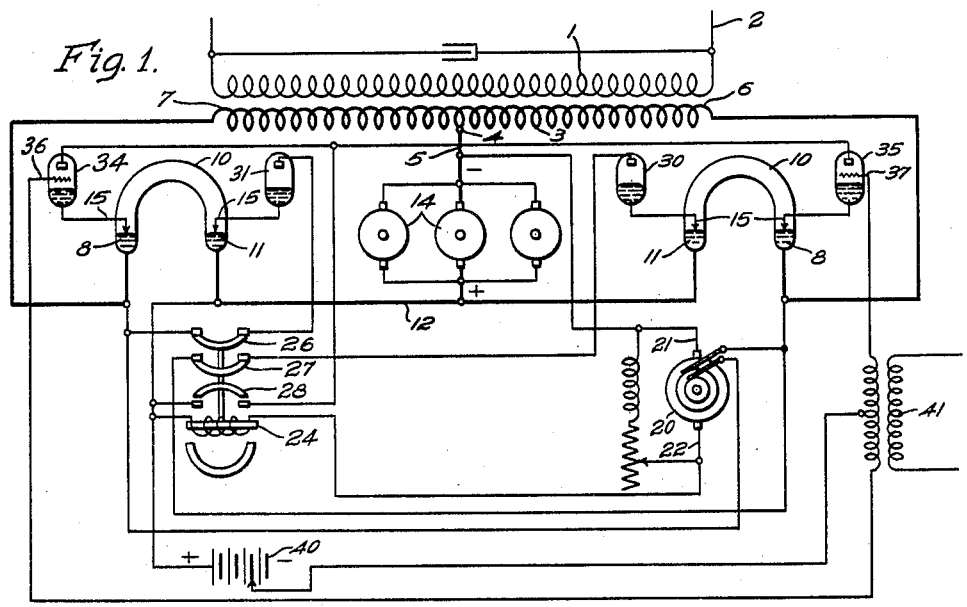
Figure 2:
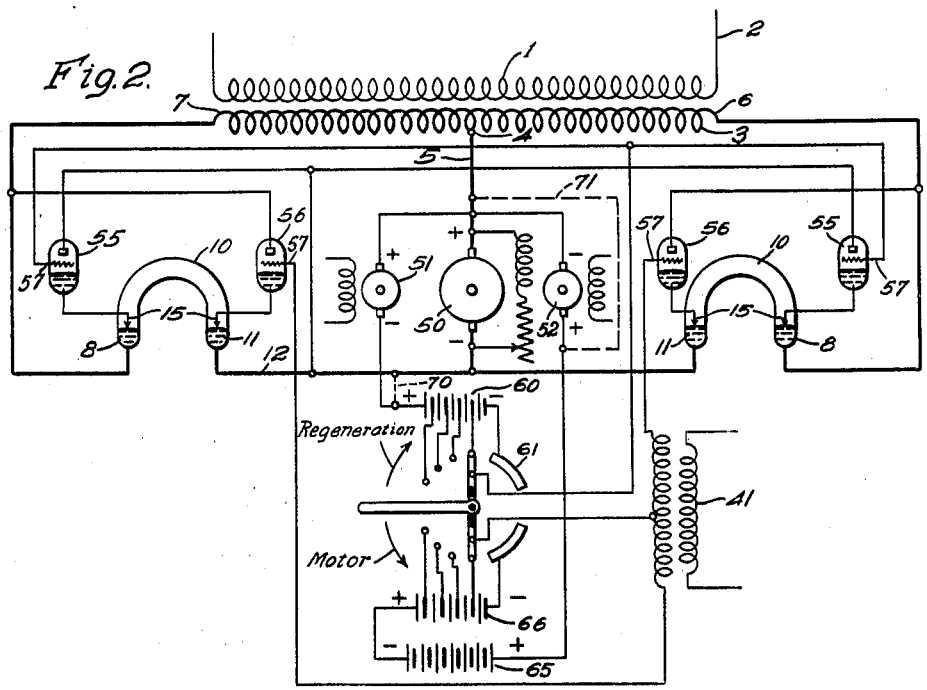

Other objects and advantages of our invention will be apparent in the following detailed description taken in conjunction with the accompanying drawing, in which Figure 1 is a schematic illustration of a converter system embodying our invention, and Fig. 2 is a modification showing the method of controlling a motor by varying the conversion characteristics.

The system according to our invention comprises a suitable transformer 1 for supplying energy from an alternating current circuit 2. The secondary 3 of this transformer is provided with a mid tap 4 for connection to one of the load circuit buses 5. Each of the free terminals 6—7 of the transformer are connected to a terminal 8 of a suitable vapor-electric rectifier 10, the opposite terminals 11 of the rectifier 10 being connected to a direct current load bus 12. A suitable load 14, such as railway motors, steel mill motors or other regenerative motors are connected across the direct current load buses.

We prefer to utilize a rectifier having a plurality of vaporizable electrodes either of which may be utilized either as anode or cathode. However, a pair of suitable oppositely connected devices such as the vectrion described in application Serial No. 626,866, filed July 30, 1932 may be substituted for the plural electrode devices.

Each electrode of the plural electrode rectifier 10 is provided with a make alive 15 for initiating a cathode spot whenever current is supplied to the make alive.

A suitable pilot device indicated as a rotary converter 20, has the direct current terminals 21—22 connected in parallel with the direct current load buses 5 and 12 while the alternating current terminals are connected across the terminals 6—7 of the supply transformer. When the load characteristic of the system is such that the motors 14 will receive energy from the system, the transfer of energy in the pilot machine 20 will be from the alternating to the direct current circuit. A suitable polarized relay 24 is placed in the direct current lead 22 of the pilot machine.

This polarized relay controls a plurality of contactors 26, 27, 28 which, in turn, control the energization of the make-alive devices 15. When the transfer of energy is from alternating current to direct current circuits, the polarized relay 24 will close the contactors 26 and 27 and establish the make-alive circuits connected from the transformer terminals 6—7 to the electrodes 11 connected to the direct current bus 12. With this connection, when a positive potential exists at the free terminal 6 of the transformer, the auxiliary rectifying device 30 in the make-alive circuit of the particular rectifier 10 involved will carry current and cause the formation of a cathode spot on the electrode 11 connected to the positive bus.

The electrode 8 connected to the transformer terminal 6 will then act as an anode and transfer energy to the direct current bus 12. On the opposite half cycle when the other terminal 7 of the transformer is positive, the auxiliary rectifier 31 is actuated to cause a similar action in the second rectifying device so that full-wave rectification ensues to supply energy to the direct current system.

If, however, the motors 14 should be braking by generating energy sufficient to produce a transfer of energy from the direct current to the alternating current circuits, the transfer of energy in the pilot machine 20 would be from the direct current to the alternating current circuits. The reverse of current in the polarized relay 24 would open the make alive circuits connected with the terminals 6 and 7 of the transformer and cause the contactor 28 to connect the make-alive circuit connected with the direct current bus 12. Suitable rectifying devices 34 and 35 are supplied in series with each of the make-alives 15 connected to the direct current bus 12.

Suitable control devices such as grids 36—37 are placed in these auxiliary rectifiers 34—35 so that the make-alive circuits can be selectively controlled. A suitable negative bias 40 is introduced between the positive direct current bus and the control grids. In order to synchronize the rectifiers with the alternating current a biasing transformer 41 is introduced in the grid control circuit so that the make alives will be actuated in synchronism with the frequency of the alternating current circuit 2.

In the modification shown in Fig. 2, a single direct current motor 50 or a group of motors to be controlled as a unit is connected across the direct current bus. The pilot machines instead of being rotary converters dependent on transfer of energy between the alternating and direct current circuits are small tachometer machines driven by a motor 50 to be controlled.

Each of the make-alives 15 in the bi-lateral rectifiers 10 are provided with auxiliary rectifiers 55—56 having suitable control means such as grids 57. When the devices are receiving power or when power is being transferred to the direct current buses, it is necessary to control the grids 57 of the auxiliary tubes 55 to produce a cathode spot on the electrode 8 connected to the transformer terminals 6—7. To accomplish this, the positive or neutral terminal 5 of the direct current system is connected to the positive terminal of the pilot machine 51 having substantially identical voltage characteristics with the load motors 50. A suitable biasing control potential 60 is introduced in series with the pilot machine 51 and a selector switch 61 used to vary the potential applied to the grid circuits 57 of the auxiliary rectifier 55.

It is preferable that the biasing potential 60 be sufficient to block the auxiliary rectifiers 55 when the controller 61 is in a neutral position. As the controller handle is swung to motoring position, the negative bias on the auxiliary rectifiers 55 is reduced allowing a cathode spot to be formed on the electrode 8 connected to the negative terminals 6 or 7 of the transformer 1.

To increase the power transfer, the negative bias may be further reduced by swinging the controller 61 further to motoring position. If, for some reason, the motor 50 being controlled should increase its speed, the pilot generator 51 would also increase its speed and increase the negative bias applied to the blocking grids 57 of the tube 55 and reduce the energy transfer to the direct current system, thereby automatically controlling the speed of the direct current motors when in motoring position.

If it is desired to use regenerative braking or to use the motor 50 as a generator, the controller handle is swung through neutral to regenerative position. In this position the pilot generator 52 provides a positive potential substantially equal to the potential of the regenerating motor 50. This is, in turn, balanced by a negative bias such as a battery 65. When the controller handle is in neutral position, the biasing battery, plus the control battery 66 should be sufficient to neutralize the pilot generator 52 and maintain the blocking grids 57 of the make-alives 56 connected to the negative direct current bus in an inoperative position. As the controller is swung towards the regenerative position, the negative bias is reduced to an extent that the grids 7 would permit the auxiliary rectifiers 56 to be operative. In order to synchronize the cathode spots with the frequency of an alternating current system, a biasing transformer 41 is introduced in the regenerative grid circuit so that the bias applied to the grids 57 varies in synchronism with the frequency of the alternating current circuit 2.

In case it is desired to have complete manual control instead of automatic control of the speed of the motor 50, the pilot motor 51 may be emitted and the motoring control battery 60 directly connected to the negative bus 12 of the direct current system and the regenerative control biasing battery 65 directly connected to the positive bus 5 of the direct current system, as shown by the broken connections 70 and 71.

While we have shown and described specific embodiments of our invention, it is apparent that changes and modifications can be made therein without departing from the spirit and scope of our invention. We desire, therefore, that only such limitations shall be imposed as are embodied in the accompanying claims or as may be necessitated by the prior art.

We claim as our invention:

1. A regenerative system comprising an A. C. supply line, a D. C. load system capable of receiving or supplying energy, a transformer, a winding on said transformer connected to the A. C. line, a second winding in said transformer, vapor electric devices interposed between the terminals of said second winding and the load system, a plurality of electrodes in said devices, means for initiating a cathode spot on either of said electrodes and means responsive to the load condition of the D. C. load system for selectively energizing said spot initiating means.

2. A regenerative system comprising an alternating current line, a direct current line, a transformer having a winding connected to the A. C. line, a plurality of dual electrode vapor-electric devices, a transformer winding having its terminal connected to said vapor electric devices, means for selectively starting a cathode spot on said electrodes and means responsive to system conditions for actuating said starting means.

3. An electrical distribution system for motors adapted for regenerative braking comprising an alternating current supply circuit, a direct current load circuit, a plurality of bilaterally conducting rectifiers for connecting said circuits, a pilot device connected to each of said circuits, a relay actuated by said pilot device and means energized by said relay for determining the direction of current flow in said rectifiers.

4. An electrical distribution system for motors adapted for regenerative braking comprising an alternating current supply circuit, a direct current load circuit, a plurality of bilaterally conducting rectifiers for connecting said circuits, a pilot device connected to each of said circuits, a relay actuated by said pilot device and means energized by said relay for determining the direction of current flow in said rectifiers, and means for synchronizing said energizing means with the frequency of the direct current circuit.

5. An electrical distribution system for motors adapted for regenerative braking comprising an alternating current supply line, a direct current load line, a vapor-electric device connecting said alternating current and direct current line, a plurality of electrodes in said device, ignition means associated with each of said electrodes for initiating a cathode spot thereon, a pilot relay connected across the load line, said relay having a continuous load characteristic through zero load, a second relay actuated by said pilot relay for selectively energizing said ignition means.

6. An electrical distribution system for motors adapted for regenerative braking comprising an alternating current supply line, a direct current load line, a vapor-electric device connecting said alternating current and direct current line, a plurality of electrodes in said device, ignition means associated with each of said electrodes for initiating a cathode spot thereon, a pilot relay connected across the load line, said relay having a continuous load characteristic through zero load, a second relay actuated by said pilot relay for selectively energizing said ignition means and means operative during periods of regeneration to synchronize said ignition means with the alternating current supply line.

7. A regenerative system comprising a direct current motor adapted for regenerative braking, an alternating current supply line, a plurality of vapor electric devices for transferring energy between said line and said motor, a plurality of electrodes in said devices, a make alive for each of said electrodes for initiating a cathode spot on the electrode so that current may flow in either direction through the vapor-electric device, and means responsive to the operation of the motor for selectively energizing said make alives.

8. A regenerative system comprising a direct current motor adapted for regenerative braking, an alternating current supply line, a plurality of vapor-electric devices for transferring energy between said line and said motor, a plurality of electrodes in said device, a make alive for each of said electrodes for initiating a cathode spot on the electrode so that current may flow in either direction through the vapor-electric devices, and means responsive to the operation of the motor for selectively energizing said make alives, a pilot device in parallel with the motor and a relay responsive to current flow in said pilot device for selectively connecting said make alives.

9. An electrical distribution system comprising an alternating current circuit, a direct current circuit, a plurality of machines adapted to receive power from and return power to the direct current circuit, a plurality of bi-laterally conducting rectifiers for connecting said circuits, a plurality of electrodes in each of said rectifiers, an ignition device for each of said electrodes, a relay connected to each of said circuits, said relay being responsive to change in the direction of power delivery in said direct current circuit, means actuated by said relay for connecting a group of said ignition devices when the direct current circuit is receiving power and for connecting a second group of said ignition devices when said direct current circuit is delivering power.

10. An electrical distribution system comprising an alternating current circuit, a direct current circuit, a plurality of machines adapted to receive power from a return power to the direct current circuit, a plurality of bi-laterally conducting rectifiers for connecting said circuits, a plurality of electrodes in each of said rectifiers, an ignition device for each of said electrodes, a relay connected to each of said circuits, said relay being responsive to change in the direction of power delivery in said direct current circuit, means actuated by said relay for connecting a group of said ignition devices when the direct current circuit is receiving power and for connecting a second group of said ignition devices when said direct current circuit is delivering power and means for causing said second group of said ignition devices to operate in synchronism with the alternating current circuit.

11. A regenerative system comprising an alternating current circuit, a direct current circuit, a plurality of vapor electric devices connected between said circuits and means for selectively initiating a cathode spot in said vapor electric devices.

12. A regenerative system comprising an alternating current line, a direct current line, a plurality of vapor electric devices connected between said circuits, a plurality of electrodes in said vapor electric devices, and means for selectively initiating a cathode spot on either of the electrodes.

13. A regenerative system comprising an alternating current line, a direct current line, a plurality of vapor electric devices connected between said circuits, a plurality of electrodes in said vapor electric devices, and means responsive to direction of power transfer for selectively initiating a cathode spot on an electrode in said vapor electric device.

14. A system for supplying energy to a regenerative load comprising an alternating current supply circuit, a direct current load circuit, a plurality of current consuming devices capable of returning current to the direct current circuit, a plurality of vapor electric devices for conveying energy between said circuits, a pilot machine delivering current in response to the load condition of the devices connected to the load circuit, a plurality of make alives in said vapor electric devices and means controlled by said pilot machine for selectively exciting the make alives.

LEON R. LUDWIG.
RUDOLF E. HELLMUND.